(No Model.)
A. WILSON.
BEARING.
No. 569,733.  Patented Oct. 20, 1896.
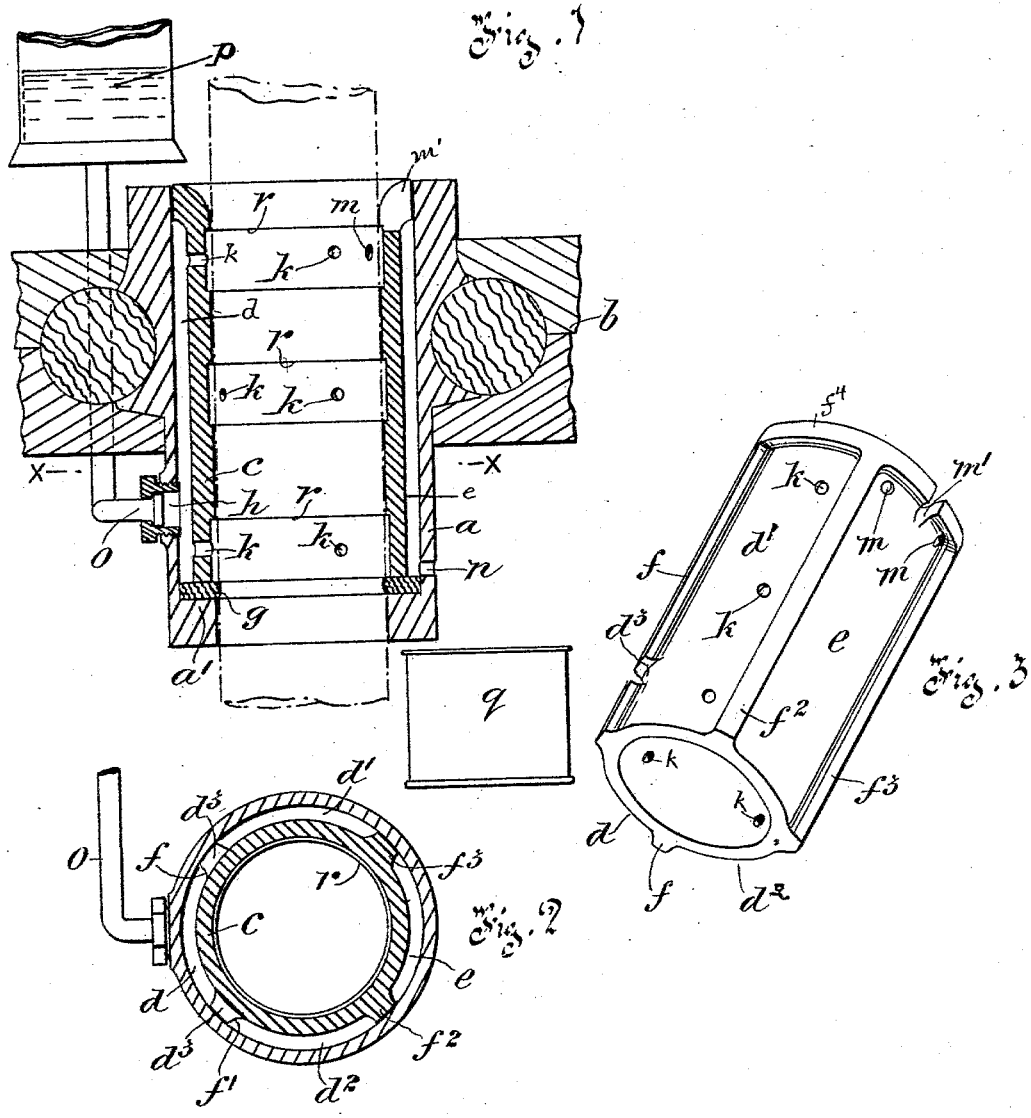

UNITED STATES PATENT OFFICE.

ANDREW WILSON, OF MONTREAL, CANADA, ASSIGNOR OF TWO-THIRDS TO FRANK WILSON AND JOHN S. CLUNIE, OF SAME PLACE.

BEARING.

SPECIFICATION forming part of Letters Patent No. 569,733, dated October 20, 1896.

Application filed November 2, 1895. Serial No. 567,769. (No model.)

*To all whom it may concern:*

Be it known that I, ANDREW WILSON, of the city of Montreal, in the district of Montreal and Province of Quebec, Canada, have invented certain new and useful Improvements in Bearings; and I do hereby declare that the following is a full, clear, and exact description of the same.

This invention relates more particularly to self-oiling bearings for vertical shafting, and has for its objects to secure a more thorough oiling thereof, to avoid waste through outward dispersion and overflow of the oil, and, further, in its adaptation to the bearings of cream-separator shafts especially to secure advantages in the way of a simple and economical construction which allows the bearings to be made in separate parts of cast-iron and brass instead of in one piece of the latter metal, thus making it unnecessary to replace more than the brass portion thereof in the event of wear and securing such a circulation of oil as will tend to keep down the temperature of the parts.

The invention consists of a bearing having an outer body and inner bearing portion proper with an intermediate passage for the oil with inlets to the face of the bearing, a supply-inlet to the passage near the lower end of the bearing, and an overflow near the upper end thereof leading to an outlet through which the oil can pass to any suitable receptacle.

Other features pertaining to the constructional detail of the parts are hereinafter particularly described, and pointed out in the claims.

Having thus referred to the principle and operation of my invention, I will now describe what I consider to be the most practical embodiment thereof in an operative device preferably shown as a bearing for the vertical shaft of a cream-separator, reference being had to the annexed drawings, forming a part of this specification, in which like symbols indicate corresponding parts, and wherein—

Figure 1 is a vertical longitudinal section of my improved bearing, showing it in place in the framing of a separator, together with a portion of the shaft and supply-tube from an oil-cup, Fig. 2 being a transverse section of same on line $x\,x$, Fig. 1, and Fig. 3 a detail perspective view of the inner bearing portion proper removed.

The outer frame or body portion $a$ of the bearing is shown in this case as an annular section having an external form adapting it for location in the framing $b$ of the cream-separator, but which could of course be of any other shape, while its inner surface is of a plain cylindrical form throughout its length except at the lower end, where an inwardly-projecting shoulder $a'$ is formed. This shoulder $a'$ serves as a seat for the inner removable bearing-section proper, $c$, in this case shown as of an integral cylindrical or sleeve form with grooves or depressions $d$, $d'$, $d^2$, and $e$ upon its exterior extending from its lower end up to a point near the top of same and separated by longitudinal ribs $f\,f'\,f^2\,f^3$ and annular flange $f^4$ at its top end. This inner section $c$ rests upon the shoulder $a'$, a suitable washer $g$ being preferably interposed, and when such section is in place the grooves $d\,d'\,d^2$ contribute, with the other parts of the structure, to the formation of a feed-channel, passage-way, or circuit leading from a supply-inlet opening $h$, made through the outer section near its lower end, and continuing by means of perforations $k$, or other communicating ways, in the part of the bearing-section proper, between the grooves $d\,d'\,d^2$, and the shaft, to the central space for this latter, whence the circuit extends through apertures $m$ or overflow-notch $m'$ at the top of the bearing to the remaining outflow portion of the passage-way, which is formed by the groove $e$, separated from and independent of the feed-section of the passage-way, (owing to the ribs $f^2\,f^3$ being left solid and imperforate throughout their length,) communicating at its lower end with an outlet-opening $n$, the three grooves $d\,d'\,d^2$ communicating with each other through notches $d^3$ in the ribs $f\,f'$.

The oil is supplied, as usual, by a tube $o$, leading from an oil-cup $p$, supported at such a level relatively to the bearing that the oil will flow upwardly through the bearing to the overflow-notch, whence any overflow will travel down the outflow-channel and be caught by a suitable receptacle, such as *q*, arranged beneath the outlet-opening *n*.

It is desirable to form annular grooves *r* in the inside face of the inner bearing-section *c*, so as to avoid any grinding action that might otherwise occur between the shaft and the edges of the perforations *k*.

What I claim is as follows:

1. A vertical-shaft bearing having an outer body and inner bearing portion proper, a supply-inlet near its lower end and an overflow at its upper end with a circuit or passage-way between such inlet and overflow, for the oil.

2. A vertical-shaft bearing having an outer body and inner removable bearing portion proper with an intermediate passage for oil and communicating ways to the face of the bearing, a supply-inlet to the passage near the lower end of the bearing and an overflow formed in same near the upper end thereof leading to an outlet as set forth.

3. A shaft-bearing having an outer body or frame section and an inner removable bearing-section proper grooved on its exterior to form independent feed and outflow spaces between the two sections, a supply-inlet to the intermediate feed-spaces, communicating ways leading from the supply-space to the inner face of the removable section, an overflow leading to the outflow-space and an outlet from this latter space, for the purpose set forth.

4. A self-lubricating bearing having an outer body or frame section and an inner bearing-section proper grooved on its exterior to form independent feed and outflow spaces between the two sections, the intermediate feed-spaces, ways for the oil leading through same to the inner bearing-face thereof, and annular grooves formed in such face in line with the inlet for the purpose set forth.

5. A self-lubricating bearing having an outer body or frame section and an inner removable bearing-section proper grooved on its exterior to form independent feed and outflow spaces between the two sections, the intermediate feed-spaces, ways for the oil leading through same to the inner bearing-face thereof and grooves formed in such face in line with the said ways, for the purpose set forth.

6. A vertical-shaft bearing having an outer body or frame section, an inner removable bearing-section proper and an intermediate annular oil chamber or passage with ways leading through the bearing-section to the face of the inner section, a supply-inlet near the lower end of the bearing and an overflow at the top of same, and grooves formed in such face in line with said ways, for the purpose set forth.

7. In a vertical-shaft bearing, an outer body or frame section having an inwardly-projecting shoulder at its lower end; an inner bearing-section proper supported by such shoulder and having independent longitudinal feed and outflow grooves or depressions on its exterior surface, a supply-inlet to the feed groove or grooves, ways from the latter to the inside face of the inner bearing-section, an overflow-opening between the said inside bearing-face and the outflow-groove and an outlet from the latter, for the purpose set forth.

8. In a vertical-shaft bearing, an outer body or frame section having an inwardly-projecting shoulder at its lower end; an inner bearing-section proper supported by such shoulder and having independent longitudinal feed and outflow grooves or depressions in its exterior surface, a supply-inlet to the feed groove or grooves, ribs intervening such grooves and communicating openings in such ribs between the feed-grooves, ways from the latter to the inside face of the inner bearing-section, an overflow-opening between the said inner bearing-face and the outflow-groove and an outlet from the latter for the purpose set forth.

9. In a self-oiling vertical-shaft bearing, an outer body or frame section having an inwardly-projecting shoulder at its lower end; an inner bearing-section proper supported by such shoulder and having independent longitudinal feed and outflow grooves or depressions in its exterior surface, an oil-supply located higher than the top of the bearing, a supply-inlet to the feed-grooves, ways from the latter to the inside face of the inner bearing-section, grooves formed in such face in line with said ways, an overflow-opening between the said inner bearing-face and the outflow-groove, and an outlet from the latter, for the purpose set forth.

Montreal, October 28, 1895.

ANDREW WILSON.

In presence of—
FRED J. SEARS,
RUPT. C. KIMBER.